No. 663,849. Patented Dec. 18, 1900.
R. BARTELL.
GARMENT POCKET.
(Application filed June 20, 1899.)
(No Model.) 3 Sheets—Sheet 1.

Witnesses
E. C. Wurdeman
S. Williamson

Inventor
Reinhold Bartell
by Geo. E. Hazelton
Atty

No. 663,849. Patented Dec. 18, 1900.
R. BARTELL.
GARMENT POCKET.
(Application filed June 20, 1899.)

(No Model.) 3 Sheets—Sheet 2.

Witnesses
E.C. Wurdeman
J.S. Williamson

Inventor
Reinhold Bartell
by Cole Hazelton
Atty

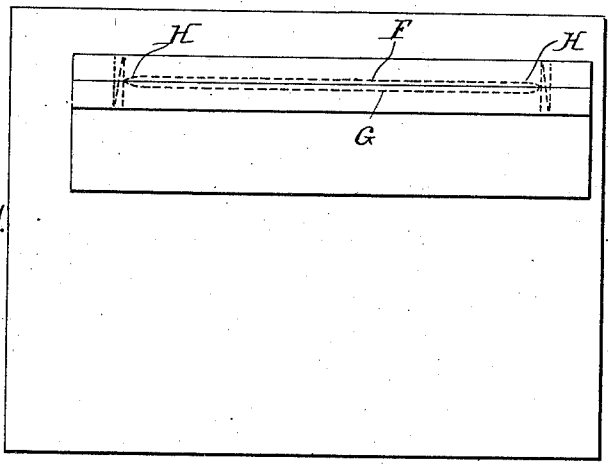
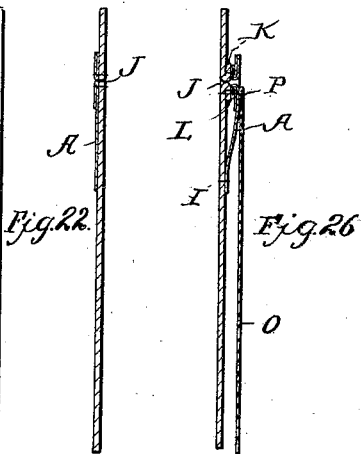
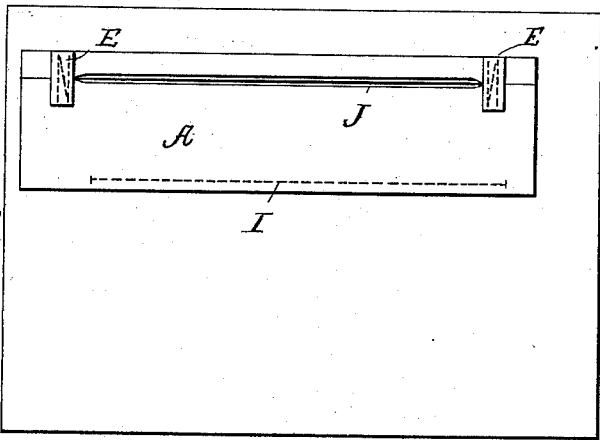
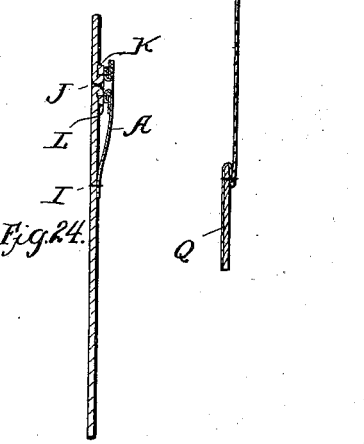
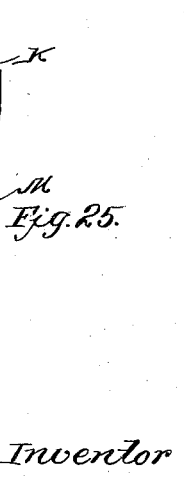

UNITED STATES PATENT OFFICE.

REINHOLD BARTELL, OF PHILADELPHIA, PENNSYLVANIA.

GARMENT-POCKET.

SPECIFICATION forming part of Letters Patent No. 663,849, dated December 18, 1900.

Application filed June 20, 1899. Serial No. 721,218. (No model.)

*To all whom it may concern:*

Be it known that I, REINHOLD BARTELL, a citizen of the United States, residing at Philadelphia, in the county of Philadelphia and State of Pennsylvania, have invented a certain new and useful Improvement in Pockets for Garments, of which the following is a specification.

My invention relates to a new and useful improvement in pockets for garments and reinforce-strips therefor, and has for its object to produce an imitation welted pocket and to form a pocket-opening at the top of the imitation welt, thereby avoiding the overlapping of the goods of the garment by the welt, providing a reinforce upon the inside of that portion of the garment which represents the welt, and making the pocket-strip in one piece; and a further object of my invention is to provide a double reinforce-strip the welted edges of which are secured together by a line of stitching, said strip being adapted to serve as a gage or pattern for cutting the pocket-opening in the garment and be utilized for securing the pocket-strip in place.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
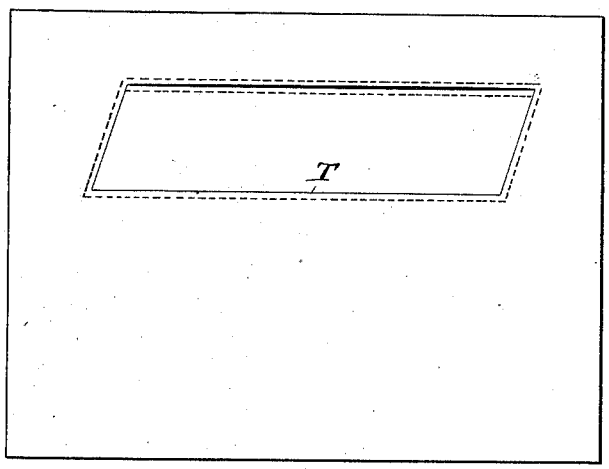
Figure 2:
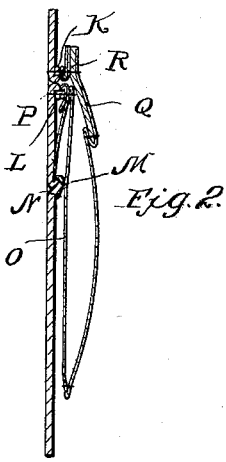
Figure 3:
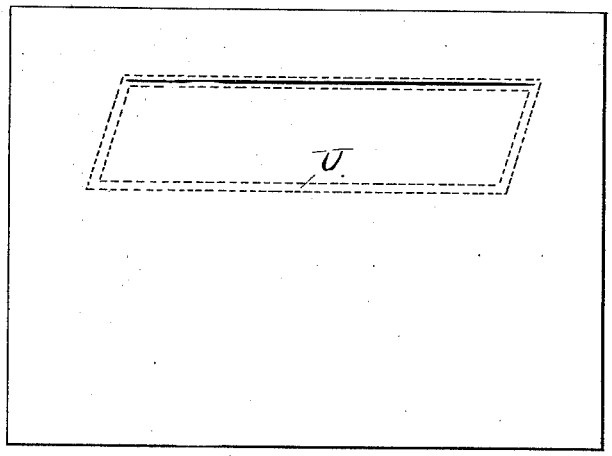
Figure 4:
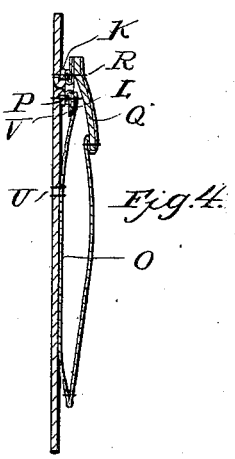
Figure 5:
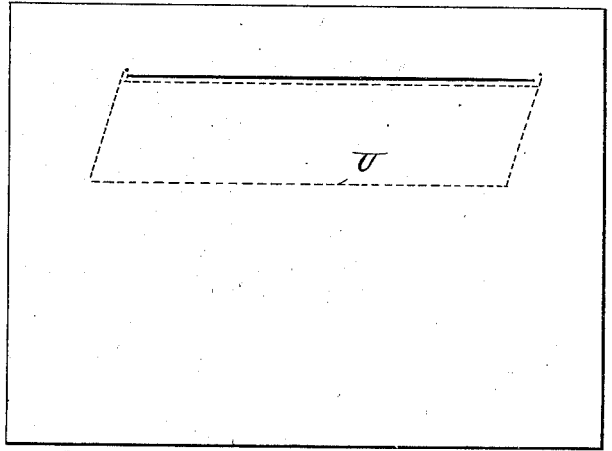
Figure 6:
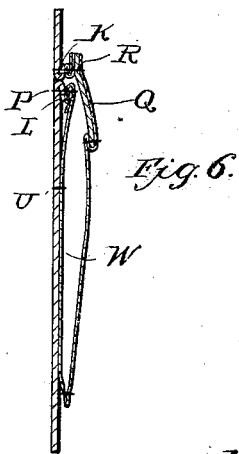
Figure 7:
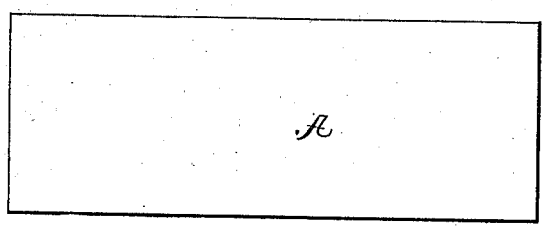
Figure 8:
Figure 9:
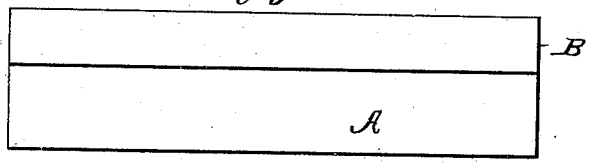
Figure 10:
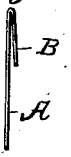
Figure 11:
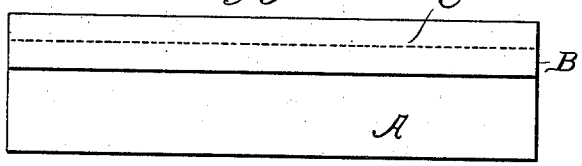
Figures 12, 13:
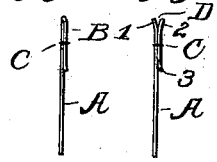
Figure 14:
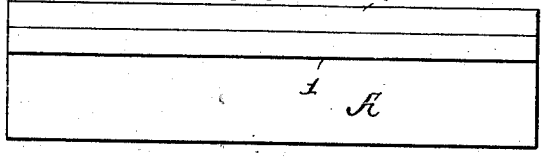
Figure 15:
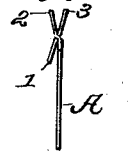
Figure 16:
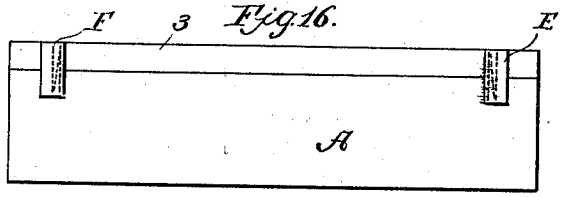
Figure 17:
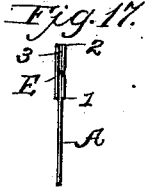
Figure 18:
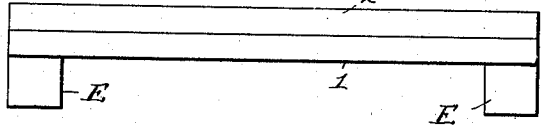
Figure 20:
Figure 19:
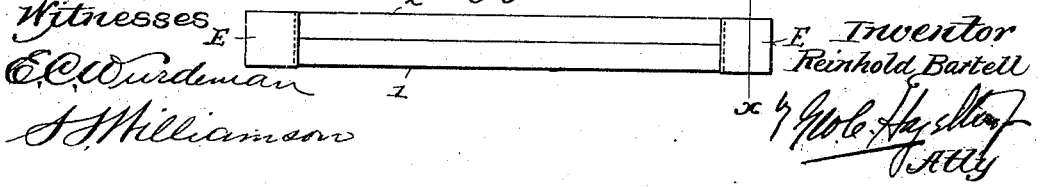

Figure 1 is a front view of a section of material, showing the opening to an imitation welt pocket and the imitation seam and the stitching around the same; Fig. 2, a vertical section of Fig. 1; Fig. 3, a view similar to Fig. 1, but showing a double-stitched pocket without the welt; Fig. 4, a section of Fig. 3; Fig. 5, a view similar to Fig. 3, showing but a single row of stitching beneath the pocket-opening and no stitching above the same; Fig. 6, a section of a pocket in which a single row of stitching is made both immediately above and below the pocket-opening and a second single row of stitching at the proper distance beneath said opening; Fig. 7, a section of suitable material from which a reinforce is to be made; Fig. 8, a section thereof; Fig. 9, a view showing the reinforce-blank folded prior to stitching; Fig. 10, a section thereof; Fig. 11, a view of the reinforce after being stitched and prior to being cut; Fig. 12, a vertical section of Fig. 11; Fig. 13, a similar view showing the upper crease of the fold cut so as to produce a double layer through a portion of the reinforce; Fig. 14, a view similar to Fig. 11 in which the ends of the folded portion of the reinforce are turned into proper position; Fig. 15, a section of Fig. 14, clearly showing the position of these ends; Fig. 16, a view similar to Fig. 14, but showing gussets stitched across the horizontal line of stitching at a distance apart equal to the length of the opening of the pocket; Fig. 17, a section of Fig. 16; Fig. 18, a modification of the arrangement shown in Fig. 16, showing gussets formed by the cutting away of a portion of the reinforce; Fig. 19, a similar view showing the gussets laid in place and stitched across the horizontal line of stitching; Fig. 20, a section at the line $x\ x$ of Fig. 19; Fig. 21, a view showing the reinforce stitched to a section of the garment prior to the cutting of the pocket-hole; Fig. 22, a section of Fig. 21; Fig. 23, a view of the reversed side of the section of the garment, showing the reinforce turned outside in and the lower portion of the reinforce stitched to the garment; Fig. 24, a section of Fig. 23; Fig. 25, a view similar to Fig. 24, showing a welt formed by the doubling up of a portion of the goods and stitching the same in place; Fig. 26, a view similar to Fig. 24, showing the section of material from which the pocket is to be formed stitched to the reinforce and garment below the pocket-opening; and Fig. 27, a rear view of the section of garment to which the pocket is secured, showing the pocket-section turned up and stitched to the reinforce above the pocket-opening.

In carrying out my invention as here embodied I first provide a section A, of suitable material, such as buckram or the like, which is of somewhat greater length than the pocket-opening to be formed in the garment, and this is folded, as indicated at B in Figs. 9 and 10, and stitched lengthwise, as indicated at C in Figs. 11 and 12. After this stitching the folded edge is cut open, as indicated at D in Fig. 13, producing the edges 1 and 2, the edge 3 being the upper edge of the ordinary reinforce-section. The edge 3 is next turned upward in the same plane with the edge 2, and the edge 1 is turned downward against the body of the reinforce, as clearly shown in Figs. 14 and 15, which produces two separate strips joined together at their folded edges by the ordinary line of stitching C, as will be readily understood. I next press the folded portions of the reinforce, so as to set them in position, as shown in Fig. 17, and, if desired, gussets E may be stitched upon the reinforce across the horizontal line of stitching C at a distance apart representing the length of the pocket-opening, so that when the opening is formed these gussets will strengthen the ends thereof and prevent ripping at these points. The reinforce after being formed as above set forth is secured upon the outer face of the garment by the lines of stitching F and G, which lie parallel throughout the greater portion of their length, but are deflected toward each other at H. A knife or other suitable implement is used to cut the threads of the line of stitching C between the two folded sections of the reinforce and at the same time to cut the pocket-opening J in the garment. The reinforce is next turned outside in by being passed through the pocket-opening J, which process will also turn in that portion of the goods of the garment lying between the lines of stitching F and G and the pocket-opening, which is designated at K and L. This, as is obvious, will leave a gap in the pocket-opening equal to the two inturned sections K and L; but as it is essential that such a gap shall not exist in the completed garment the drawing lengthwise of the goods, including the reinforce, will cause this gap to close by reason of the deflected portion H of the stitching, and when the garment is pressed the pocket-opening will be completely closed—that is to say, the folded edges produced by the inturning of the sections K and L will lie against each other. The parts when arranged as above described will produce a normally-closed pocket-opening, which is the most essential feature of my invention, since by these steps an opening is formed without disturbing the pattern of the goods, so that the pattern always matches across the opening, and this without any care upon the part of the operator, which is obviously a most advantageous feature, since all the pocket-openings of a garment will be perfectly uniform and will under no circumstances gap nor will the pattern be disturbed at this point. Another advantage of this means of forming a pocket-opening and reinforcing the same is that no extra goods are required, and thus a saving is made both in material and labor, since by the old method not only must extra goods be provided for the formation of the pocket-opening and the reinforcing thereof, but considerable skilled labor is required to properly stitch the same in place, and it is a well-known fact that the pattern of the goods cannot be matched throughout the length of the pocket-opening by the old means, and when this pattern is a pronounced stripe lying at right angles to the pocket-opening a most serious defect is produced in the appearance of the completed garment. This is entirely overcome by my improvement and both labor and material are saved, while at the same time a decided improvement made in the appearance of the completed garment.

If it is desired to produce an imitation welted pocket, a portion of the goods are folded upon itself, as shown in Fig. 25, and stitched, as indicated at M, and then restitched, as indicated at N. The next operation after the securing of the reinforce and the forming of the pocket-opening is the formation of the pocket, and this is accomplished, whether or not the imitation welt is used, by stitching the pocket-strip O at its upper edge to the lower section of the reinforce and the garment by the line of stitching P. This pocket-strip before thus being stitched to the garment has a fastening Q secured thereto, as shown in Fig. 26, said fastening being of the same goods as the garment, and this fastening is turned upward and stitched at R to the upper section of the reinforce, as clearly shown in Figs. 2 and 27, the remaining operation to complete the pocket being to close the sides of the pocket-strip by suitable stitching S.

If desired, the outer surface of the garment may be given the appearance entirely around the pocket of an imitation welt, as shown at T in Fig. 1, or a double row of stitching U may be used to form the imitation welt, as shown in Figs. 3 and 4, or a welt may be formed at the bottom and two rows of stitching utilized upon the sides.

In Figs. 3 and 4 a slight modification is shown in which the lower section of the reinforce is cut away or formed the same width of the upper section, as shown at V. In Figs. 5 and 6 a further modification is shown, in which the pocket-strip W is utilized as the reinforce—that is to say, the pocket-strip is stitched directly to the goods of the garment in the same manner as that described in connection with the reinforce, thus saving a certain amount of material.

Of course I am aware that other modifications might be made within certain limits without departing from the spirit of my invention, and I do not wish to be limited to the exact details here shown and described, since the gist of my invention rests in the broad idea of so forming a pocket and the opening thereto as to require no extra goods and to avoid disturbing the pattern of the goods of the garment and to produce a pocket-opening which is normally closed without pucker or strain.

Having thus fully described my invention, what I claim as new and useful is—

1. In a pocket for garments, the herein-described reinforcing-strip which consists of a folded section of fabric abutted against another folded section of fabric, the fold-line of each section facing the fold-line of the opposing section, and secured together on such fold-lines by through-and-through stitches, as set forth.

2. The herein-described pocket for garments, the same comprising a pocket having an opening with its edges turned back on the inside, reinforce-strips sewed to the said edges above and below the pocket-opening and means whereby the edges of the pocket-opening are normally maintained in contact, substantially as described.

In testimony whereof I have hereunto affixed my signature in the presence of two subscribing witnesses.

REINHOLD BARTELL.

Witnesses:
MARY E. HAMER,
S. S. WILLIAMSON.